US012651681B2

(12) United States Patent
Fielding

(10) Patent No.: US 12,651,681 B2
(45) Date of Patent: Jun. 9, 2026

(54) ADHESIVE-BACKED ELECTRICAL CABLE ASSEMBLY

(71) Applicant: Duane Fielding, Washington, UT (US)

(72) Inventor: Duane Fielding, Washington, UT (US)

( * ) Notice: Subject to any disclaimer, the term of this patent is extended or adjusted under 35 U.S.C. 154(b) by 174 days.

(21) Appl. No.: 18/628,442

(22) Filed: Apr. 5, 2024

(65) Prior Publication Data

US 2024/0339246 A1     Oct. 10, 2024

Related U.S. Application Data

(63) Continuation-in-part of application No. 29/913,468, filed on Oct. 2, 2023, now Pat. No. Des. 1,078,651.

(Continued)

(51) Int. Cl.
| | |
|---|---|
| *H01B 7/40* | (2006.01) |
| *H01B 7/00* | (2006.01) |
| *H01R 13/443* | (2006.01) |
| *H01R 13/652* | (2006.01) |
| *H01R 13/66* | (2006.01) |
| *H01R 13/713* | (2006.01) |
| *H01R 13/73* | (2006.01) |
| *H01R 24/78* | (2011.01) |
| *H01R 25/00* | (2006.01) |
| *H02G 3/00* | (2006.01) |
| *H02G 3/08* | (2006.01) |
| *H01R 103/00* | (2006.01) |

(52) U.S. Cl.
CPC ............. *H01B 7/40* (2013.01); *H01B 7/0081* (2013.01); *H01R 13/443* (2013.01); *H01R 13/652* (2013.01); *H01R 13/665* (2013.01); *H01R 13/7135* (2013.01); *H01R 13/73* (2013.01); *H01R 24/78* (2013.01); *H01R*

*25/006* (2013.01); *H02G 3/081* (2013.01); *H02G 3/266* (2013.01); *H01R 2103/00* (2013.01)

(58) Field of Classification Search
CPC ................................. H01B 7/0081; H01B 7/08
USPC ............................................ 174/117 F, 117 A
See application file for complete search history.

(56) References Cited

U.S. PATENT DOCUMENTS

| | | | |
|---|---|---|---|
| 2,702,893 A | 2/1955 | Paulson |
| 2,792,561 A | 5/1957 | Cohen |

(Continued)

FOREIGN PATENT DOCUMENTS

EP            1447821 A2     8/2004

*Primary Examiner* — Chau N Nguyen
(74) *Attorney, Agent, or Firm* — Gurr & Brande, PLLC; Robert A. Gurr

(57) ABSTRACT

An adhesive-backed electrical cable assembly includes a first electrical connector, a second electrical connector opposite the first electrical connector, and an electrical cable therebetween. The electrical cable features a body having a flat side with an adhesive layer and a release liner coupled to the adhesive layer. In some examples, the body is semi-rigid and designed to conform to the angles of a wall, floor, or ceiling. The adhesive-backed electrical cable assembly complements the aesthetic design of a surface to which it is adhered, thereby reducing clutter and preventing tripping and fire hazards. An electrical outlet is also disclosed that features one or more receptacles and one or more plugs along the front and sides of the electrical outlet. In some examples, the adhesive-backed electrical cable assembly includes outlet plug covers and is configured to mount on a wall, rather than in a wall.

2 Claims, 18 Drawing Sheets

Related U.S. Application Data

(60) Provisional application No. 63/622,951, filed on Jan. 19, 2024, provisional application No. 63/598,365, filed on Nov. 13, 2023, provisional application No. 63/495,025, filed on Apr. 7, 2023.

(56) References Cited

U.S. PATENT DOCUMENTS

| | | | |
|---|---|---|---|
| 3,253,085 A | | 5/1966 | Stern |
| 3,997,225 A | * | 12/1976 | Horwinski ........... H01R 13/648 |
| | | | 439/652 |
| 4,293,173 A | | 10/1981 | Tricca |
| 8,536,998 B1 | * | 9/2013 | Siu .......................... H04L 67/12 |
| | | | 340/870.01 |
| 8,604,343 B2 | * | 12/2013 | Nixon-Lane ........... E06B 1/528 |
| | | | 174/505 |
| 9,640,958 B2 | * | 5/2017 | Dower ................... H02G 3/266 |
| 9,935,440 B1 | | 4/2018 | Szeto et al. |
| 2001/0015283 A1 | * | 8/2001 | Sexton ................... H01R 25/16 |
| | | | 174/117 F |
| 2015/0236449 A1 | * | 8/2015 | Puschnigg ........... H01R 13/465 |
| | | | 439/304 |
| 2015/0255932 A1 | | 9/2015 | Dicks et al. |
| 2022/0029362 A1 | * | 1/2022 | Shen ................... H02J 13/0005 |

* cited by examiner

300

500

500

500

519

ADHESIVE-BACKED ELECTRICAL CABLE ASSEMBLY

CROSS-REFERENCE TO RELATED APPLICATIONS

This application claims the benefit of U.S. Provisional Application Ser. No. 63/495,025, filed on Apr. 7, 2023, is a continuation-in-part of U.S. Design patent application Ser. No. 29/913,468, filed on Oct. 2, 2023, and further claims the benefit of U.S. Provisional Application Ser. No. 63/598,365, filed on Nov. 13, 2023, and further claims the benefit of U.S. Provisional Application Ser. No. 63/622,951, filed on Jan. 19, 2024, all of which are incorporated herein by reference.

TECHNICAL FIELD

The present disclosure relates generally to the field of electrical cables. In particular, the present disclosure relates to an adhesive-backed electrical cable and outlet assemblies configured to aesthetically conform to the walls, floors, and ceilings within a building.

BACKGROUND

An electrical cable is an assembly of one or more wires that are bundled together and used as an electrical conductor to carry electric current. One of the primary uses of electrical cables is to facilitate the transmission of power from a power outlet to an electronic device such as a television, kitchen appliance, etc. Exposed power cables pose a tripping hazard that can injure the user or break the electronic device if tipped over, and are not aesthetically pleasing.

In addition, the outer jacket material of electrical cables are usually constructed of rounded, flexible plastic (e.g., PVC). Due to the flexible nature of the outer jacket, the electrical cable twists and turns creating unsightly clutter. Further, because of its rounded shape, electrical cables do not rest uniformly on flat surfaces. For example, the electrical cable may dangle down a wall or follow erratically along a baseboard. The appearance of the outer jacket, furthermore, does not typically blend well with the colors and textures within a room. Common accessories on the market such as rubber clamps, wall anchors, screws, and retractable reels can be similarly unattractive, difficult to install, and often leave permanent damage to the wall.

Accordingly, there is a need for an electrical cable that follows straight lines, bends at corners, is adherable to flat surfaces, reduces tripping and fire hazards, and matches the aesthetic design of the surface to which it is adhered. The present disclosure solves these problems and others.

SUMMARY OF EXAMPLE EMBODIMENTS

In some embodiments, an adhesive-backed electrical cable assembly comprises a first electrical connector, a second electrical connector opposite the first electrical connector, and an electrical cable therebetween. The electrical cable may have a body that is manufactured to be straight or include one or more curves or bends. In some embodiments, the body is semirigid, being configured to be both stiff and flexible whereby a user can bend the body to conform to angles of a wall, floor, or ceiling during application.

In some embodiments, the adhesive-backed electrical cable assembly further comprises an adhesive layer that is coextensive with the first surface of the body and a release liner coupled to said adhesive layer. In some embodiments, the adhesive layer may be a double-sided adhesive layer that is couplable by a user to the electrical cable as an aftermarket adaptation.

In some embodiments, an adhesive-backed electrical cable assembly comprises an electrical outlet that features one or more receptacles and one or more plugs along the front and sides of the electrical outlet. The layout of the receptacles and plugs may be configured such that when an electrical cable is coupled therein that the body of the electrical cable is flat against the wall to which the electrical outlet is installed. The electrical outlet may be a ground fault interrupter (GFI) outlet configured to monitor the current flow through the electrical wiring and alert the user of any faults. Outlet plug covers that are complementary in size and shape to the one or more receptacles and one or more plugs may be coupled thereto.

In some embodiments, an adhesive-backed electrical cable assembly features an adapter configured to make the adhesive-backed electrical cable be compatible with either receptacles or plugs via either the male connector or female connector ends of the adhesive-backed electrical cable.

DETAILED DESCRIPTION OF EXAMPLE EMBODIMENTS

Figure 1:
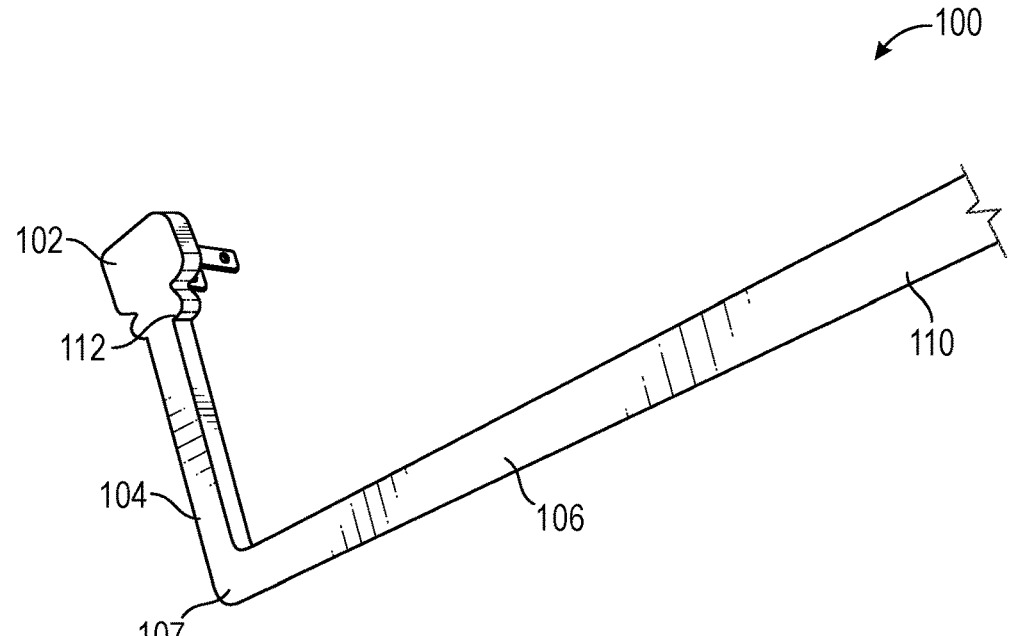
FIG. 1 illustrates a top side perspective view of an adhesive-backed electrical cable assembly.
Figure 2:
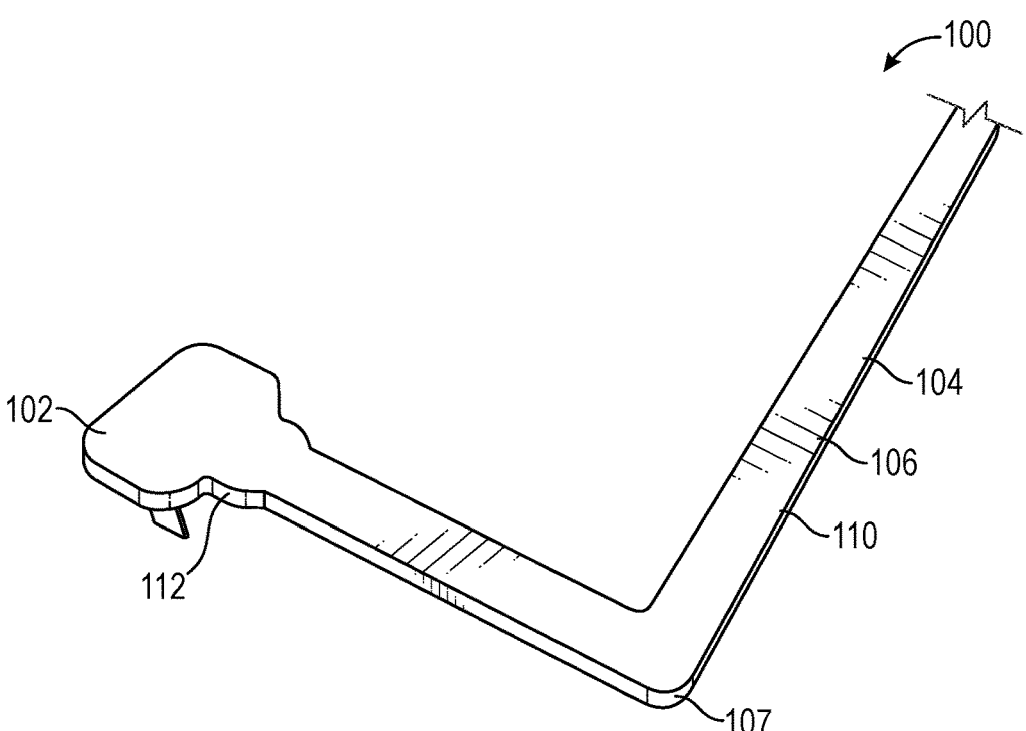
FIG. 2 illustrates a top side perspective view of an adhesive-backed electrical cable assembly.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, electrical cables cause unsightly clutter and tangled messes associated with tripping and fire hazards. Accordingly, there is a need for an electrical cable system that both follows straight lines and bends at corners, is adherable to surfaces, and matches the aesthetic design of the surface to which it is adhered. The adhesive-backed electrical cable and electrical outlet housing disclosed herein solves these problems and others.

Referring now to FIGS. 1-5, in some embodiments, an adhesive-backed electrical cable assembly 100 may comprise a first electrical connector 102 (e.g., plug), a second electrical connector (e.g., socket, not shown) opposite the first electrical connector 102, and an electrical cable 104 extending between the first connector 102 and the second connector. The first electrical connector 102 may be a male connector such as a molded electrical plug while the second electrical connector may be a female connector such as a molded electrical receptacle or vice versa. The electrical cable 104 may comprise a body 106 that is manufactured to be straight or, as shown, though without limitation, have one or more fixed curves or bends, such as elbow bend 107.

In some embodiments, the body 106 is semirigid, being configured to be both stiff and flexible, whereby a user can bend the body 106 to conform to the angles of a wall, floor, or ceiling during application. In other words, the materials forming the adhesive-backed electrical cable assembly 100 do not exhibit springback. The body 106 may have a high Young's modulus indicative of stiff resistance to deflection while also maintaining some flexibility relative to the scale of the parts of the body 106. The body 106 may comprise flexible polyvinyl chlorides, ethylene vinyl acetates, and/or related polymers. In some embodiments, the body 106 may comprise fibers or materials configured to be stiff under tensile forces but flexible under compressive forces to allow twists and turns to be accomplished along the body 106.

It will be appreciated that the body 106 enables the electrical cable 104 to be shaped in varying configurations ranging between straight lines and 90° elbow turns. A user may thereby shape the adhesive-backed electrical cable assembly 100, for example, to follow straight down the edge of a wall and then turn along a baseboard. In addition, the body 106 protects inner wires of the electrical cable 104 from external physical forces, water damage, and chemical deterioration. A user may step on the body 106 of the adhesive-backed electrical cable assembly 100 without causing mechanical damage to the inner wires (107, best shown in FIGS. 4-5).

The adhesive-backed electrical cable assembly 100, in some embodiments, may comprise a first surface 108 and a second surface 110 opposite the first surface 108. The first surface 108 may be substantially flat, thereby maximizing the surface area that can be adhered to the wall, floor, or ceiling. The second surface 110 may also be smooth or rounded to maintain a low profile that avoids attracting attention. The adhesive-backed electrical cable assembly 100 may comprise a beveled edge 112 along the body 106 and/or the first and second electrical connectors between the first and second surface 108, 110. The beveled edge 112 is not perfectly perpendicular to the first and second surface 108, 110 of the adhesive-backed electrical cable assembly 100. It will be appreciated that the beveled edge 112 is a softer edge that increases safety as opposed to sharp corners, is wear resistant, and appears more aesthetically pleasing during use.

It is contemplated that the body 106 of the electrical cable 104 may comprise a covering, not depicted herein, having various flooring and wall materials configured to blend into or complement existing materials present at application. In some embodiments, for example, the covering may comprise wood, laminate, vinyl, linoleum, stone, tile, or textile. Said materials of the covering may be couplable to the second surface 110 of the body 106 that is viewable by a user after application of the adhesive-backed electrical cable assembly 100. Said materials may feature gaps or break points between individual pieces of a given material to accommodate the bending of the body beneath the covering. The covering may comprise a semi-circular canal or conduit couplable to the body 106 of the adhesive-backed electrical cable assembly 100. The covering enables materials of varying stiffness to be used, as described above, while the body 106 maintains a degree of flexibility for placement during application.

Figure 3:
FIG. 3 illustrates a bottom side perspective view of an adhesive-backed electrical cable assembly.
Figure 3:
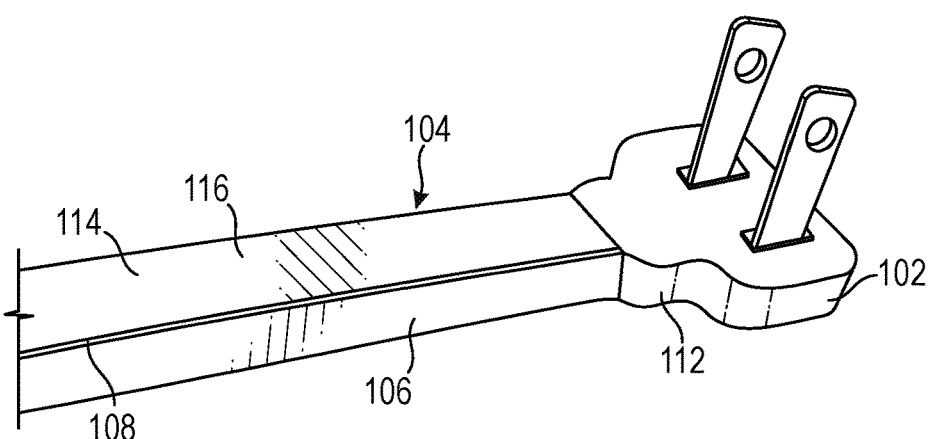
Figure 4:
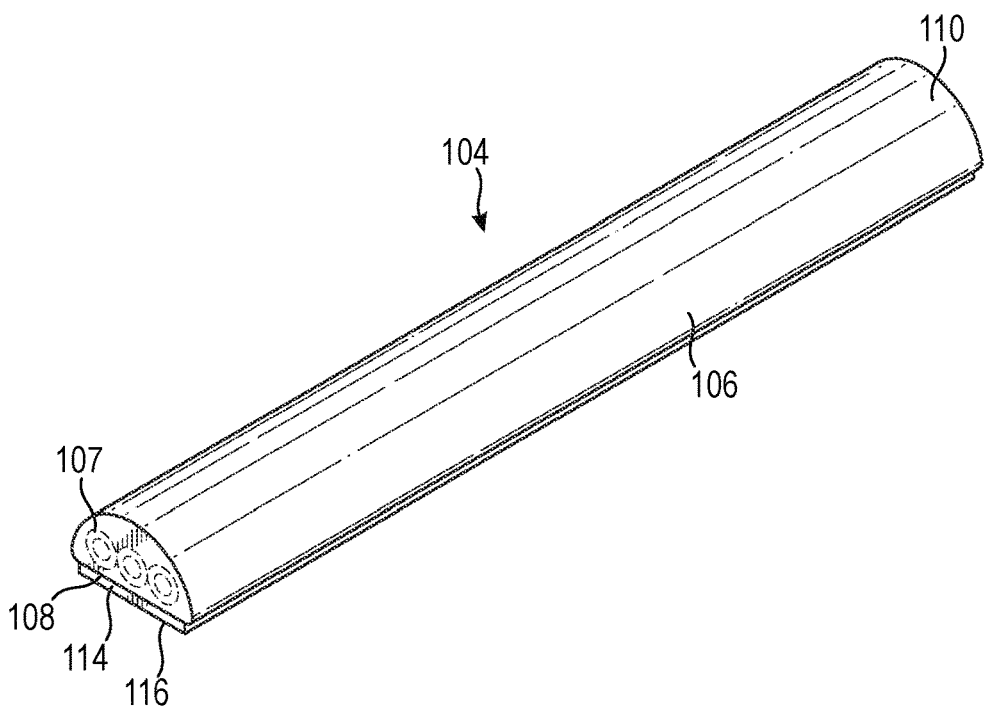
FIG. 4 illustrates a top, front perspective view of an adhesive-backed electrical cable assembly.
Figure 5:
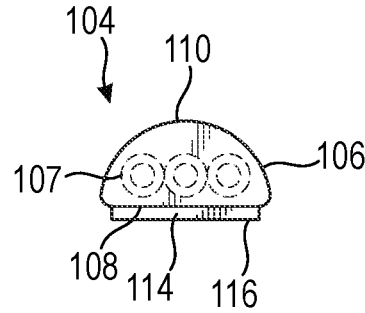
FIG. 5 illustrates a front, elevation view of an adhesive-backed electrical cable assembly.
Figure 6:
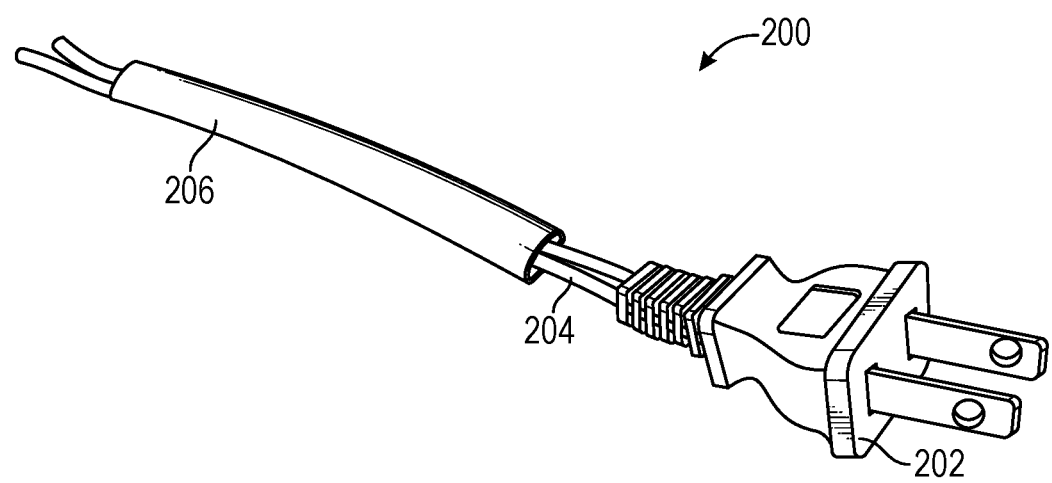
FIG. 6 illustrates a front top perspective view of an adhesive-backed electrical cable assembly.
Figure 7:
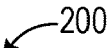
FIG. 7 illustrates a rear top perspective view of an adhesive-backed electrical cable assembly.
Figure 7:
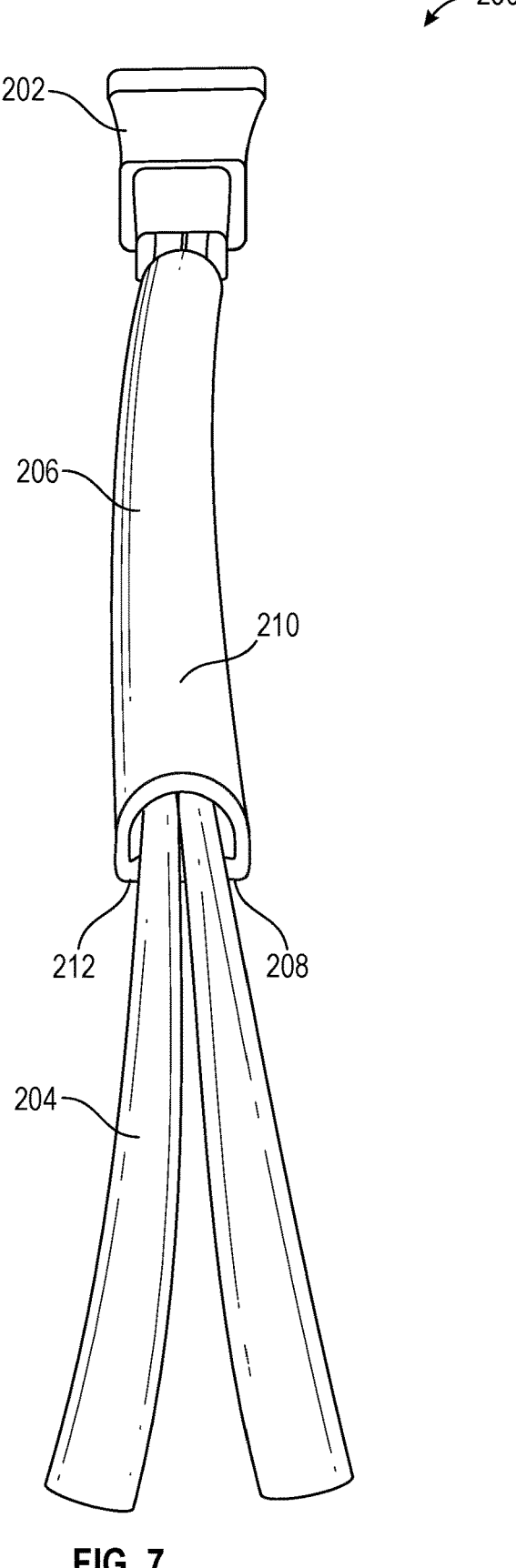
Figure 8:
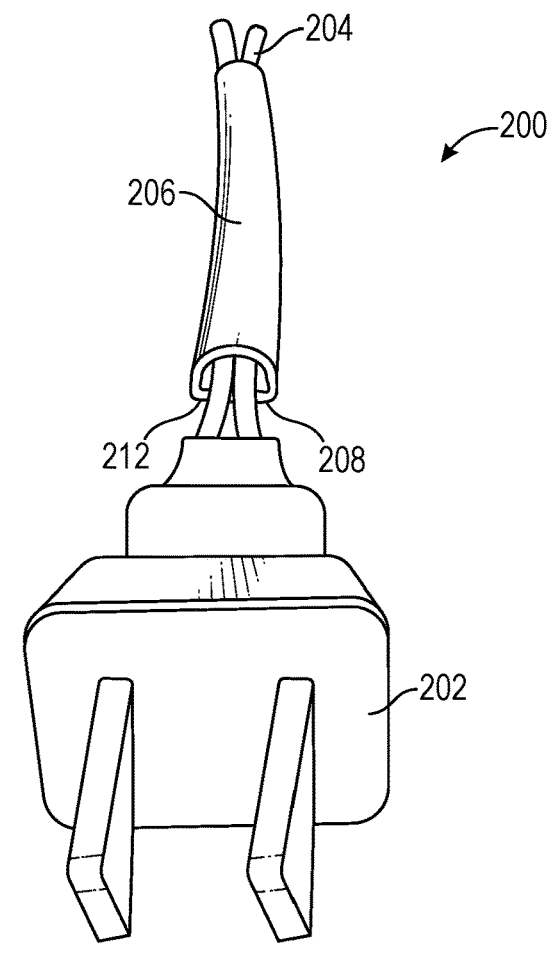
FIG. 8 illustrates a front top perspective view of an adhesive-backed electrical cable assembly.
Figure 9:
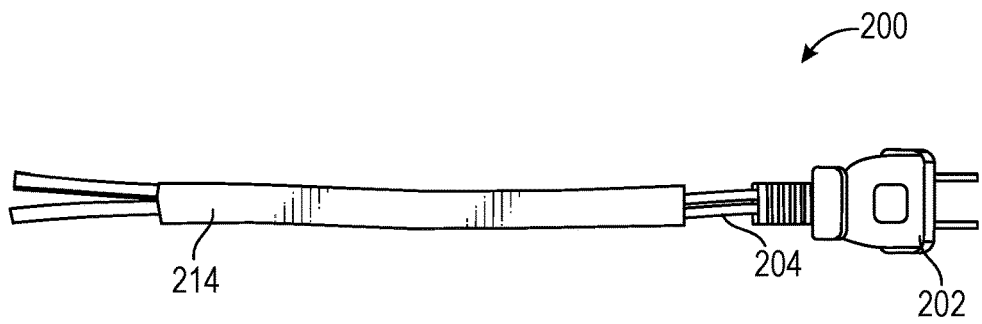
FIG. 9 illustrates a bottom plan view of an adhesive-backed electrical cable assembly.
Figure 10:
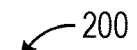
FIG. 10 illustrates a disassembled side perspective view of an adhesive-backed electrical cable assembly.
Figure 10:
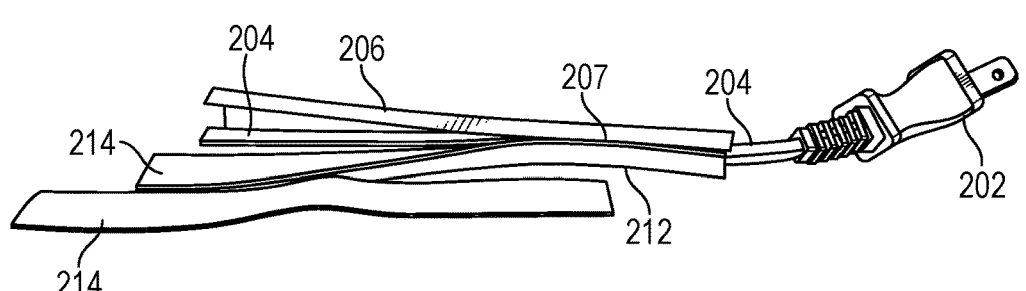

As best seen in FIGS. 3-5, the adhesive-backed electrical cable assembly 100 may further comprise an adhesive layer 114 that is coextensive with the first surface 108 of the body 106 of the electrical cable 104, and a release liner 116 coupled to the adhesive layer 114. The adhesive layer 114 may be configured to either removably or permanently adhere to surfaces such as walls, floors, and ceilings. In some embodiments intended for temporary, detachable adherence to a surface, the adhesive layer 114 may comprise removable tapes (e.g., available from 3M®), mounting putty, sticky tack, or related pressure-sensitive adhesive materials known in the art. It will be appreciated that said embodiments enable a user to detach the adhesive layer 114 and reuse the adhesive-backed electrical cable assembly 100 in alternative rooms and locations.

In some embodiments intended for more permanent adherence, the adhesive layer 114 may comprise epoxy resins, polyvinyl acetates such as wood glue, polyurethanes, and related adhesives. The release liner 116 may comprise film, starch, lamination, or other backing that provides a means to protect and transport the adhesive layer 114 to its final application point and prevent the adhesive layer 114 from sticking to things until the user is ready for application. Prior to application, the surface to which the adhesive-backed electrical cable assembly 100 is adhered should be cleaned to remove dirt, dust, and other contaminants, aiding in the formation of proper bonding between the adhesive layer 114 and the surface.

A method of using an adhesive-backed electrical cable assembly 100, according to some embodiments, comprises removing a release liner 116 from an adhesive layer 114 and engaging the adhesive layer 114 with the surface of a floor, wall, or ceiling, wherein a body 106 of the adhesive-backed electrical cable assembly 100 substantially blends in with or complements the surface of the floor, wall, or ceiling. The method may further comprise coupling a first electrical connector 102 into a power outlet and a second electrical connector into an electrical device.

In some embodiments, as shown in FIGS. 6-11, an adhesive-backed electrical cable assembly 200 may comprise a first electrical connector 202 coupled to an electrical cable 204. The adhesive-backed electrical cable assembly 200 may comprise a flexible electrical sleeve 206 configured to couple to the electrical cable 204. The sleeve 206 may comprise a first surface 208 and a second surface 210 opposite the first surface 208. The adhesive-backed electrical cable assembly 200 may comprise an adhesive layer 212 that is coextensive with the first surface 208 of the sleeve 206, and a release liner 214 (FIGS. 9-10) coupled to the adhesive layer 212. As understood, the sleeve 206 may be an aftermarket accessory that is couplable to extension cords in the art, allowing them to be adhered to walls or surfaces. For example, the sleeve 206 may comprise a slit 207 along its length wherein the 204 may be inserted therein. Once inserted, the release liner 214 may be removed from the adhesive layer 212, allowing the adhesive layer 212 to contact a surface.

Figure 11:
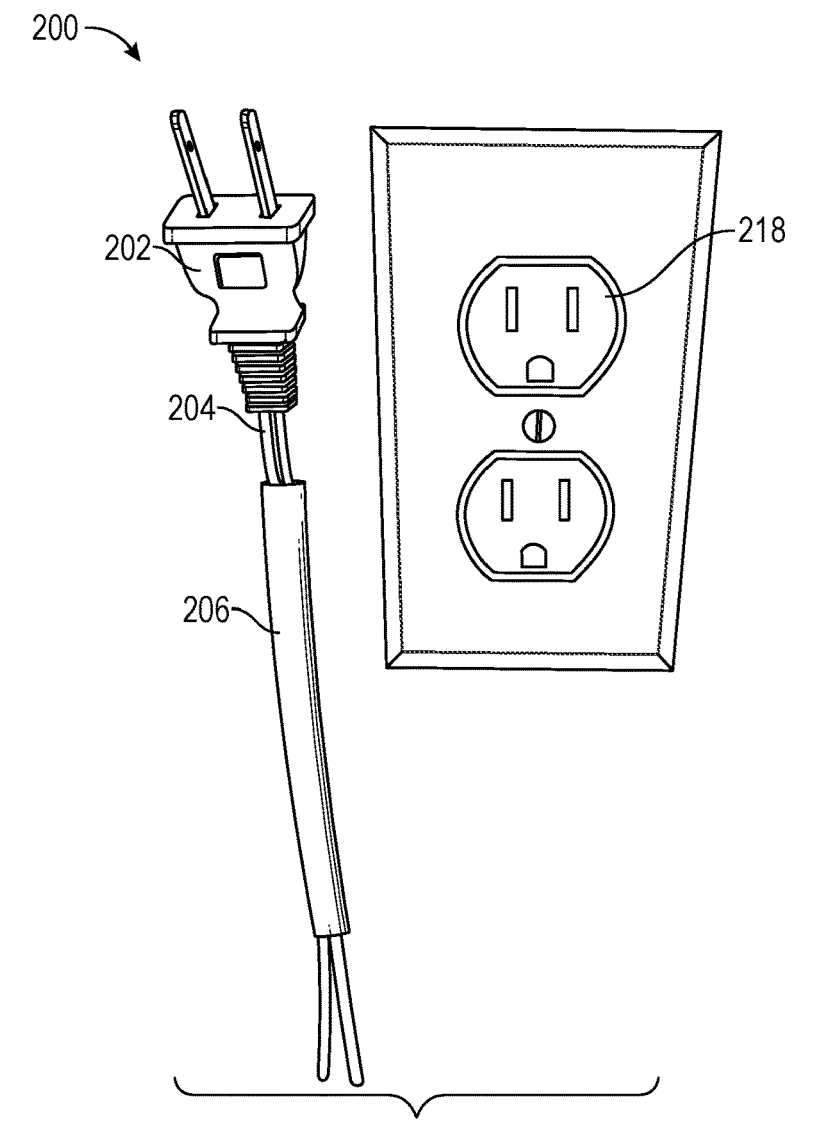
FIG. 11 illustrates a top elevation view of an adhesive-backed electrical cable assembly adhered to a wall.
Figure 12:
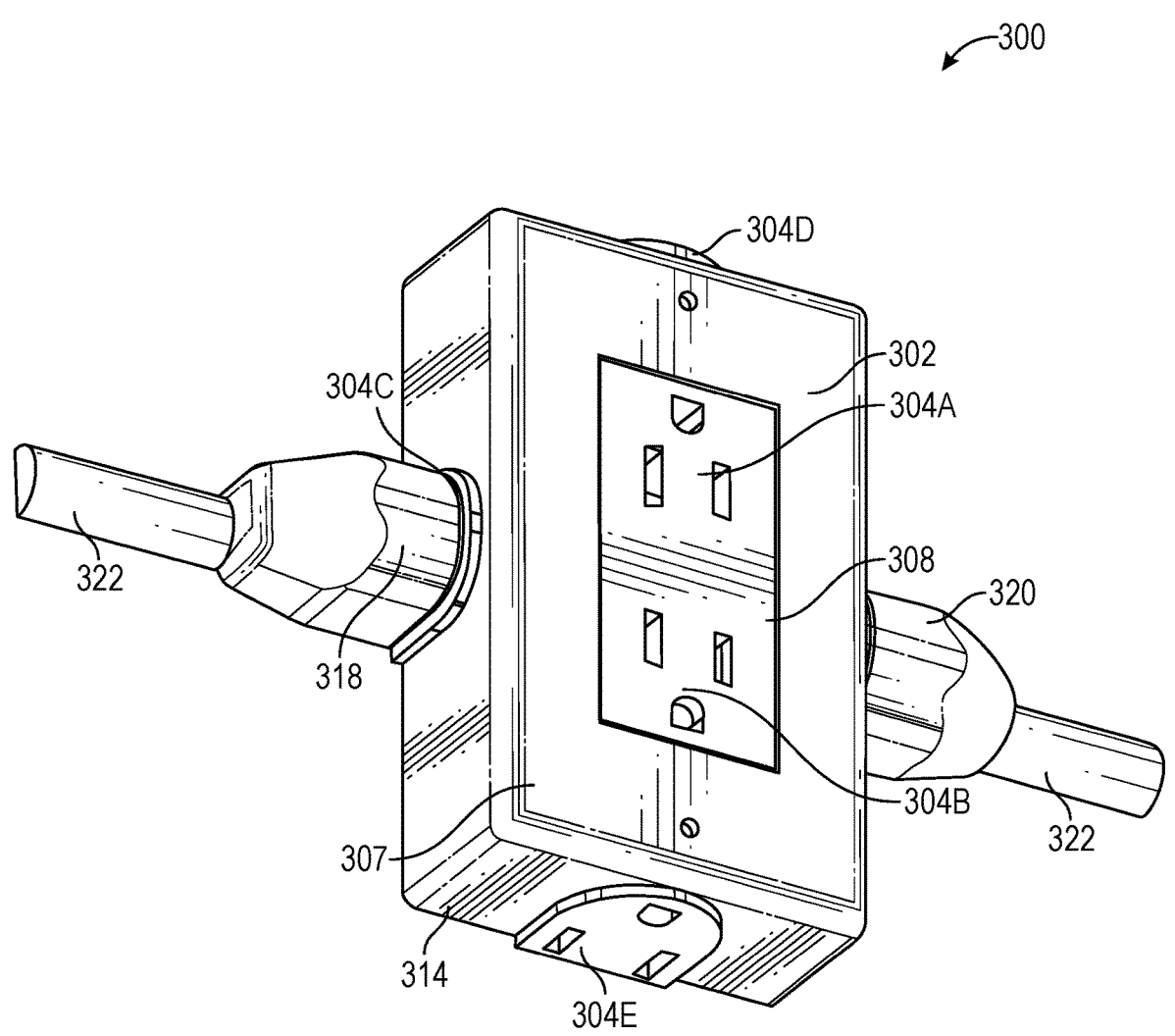
FIG. 12 illustrates a font side perspective view of an adhesive-backed electrical cable and electrical outlet assembly.

As best seen in FIG. 11, the adhesive-backed electrical cable assembly 200 may be adhered to a wall near a power outlet 218. The coloring, materials, patterns, and other aesthetic characteristics of the sleeve 206 of the adhesive-backed electrical cable assembly 200 may blend in or complement existing materials present at the application point. A neutral grey tone of the flexible electrical jacket 206, for example, could complement corresponding neutral colors of the power outlet 218 and a cream-colored wall.

It is contemplated that in some embodiments, the adhesive layer 212 may be a double-sided adhesive layer that is couplable by a user to the electrical cable 200 as an aftermarket adaptation. For example, the adhesive layer 212 may function as the first surface 208 of the sleeve 206, the sleeve comprising a semi-circular configuration. For example, a user may adhere the cable 204 to the adhesive layer 212, and may then place the sleeve 206 over the top of, and enclosing, the cable 204, with the edges of the sleeve 206 contacting an adhesive surface of the adhesive layer 212, thereby enclosing the cable 204.

As illustrated in FIGS. 12-19, in some embodiments, an adhesive-backed electrical cable and outlet assembly 300 comprises an electrical outlet 302 that comprising one or more receptacles 304A-E and one or more plugs 306 along various surfaces of the electrical outlet 302. Without limitation, the electrical outlet 302 may be a rectangular prism in shape, though other shapes are contemplated, wherein opposite sides of the rectangular prism's faces are equal and parallel to each other.

Figure 13:
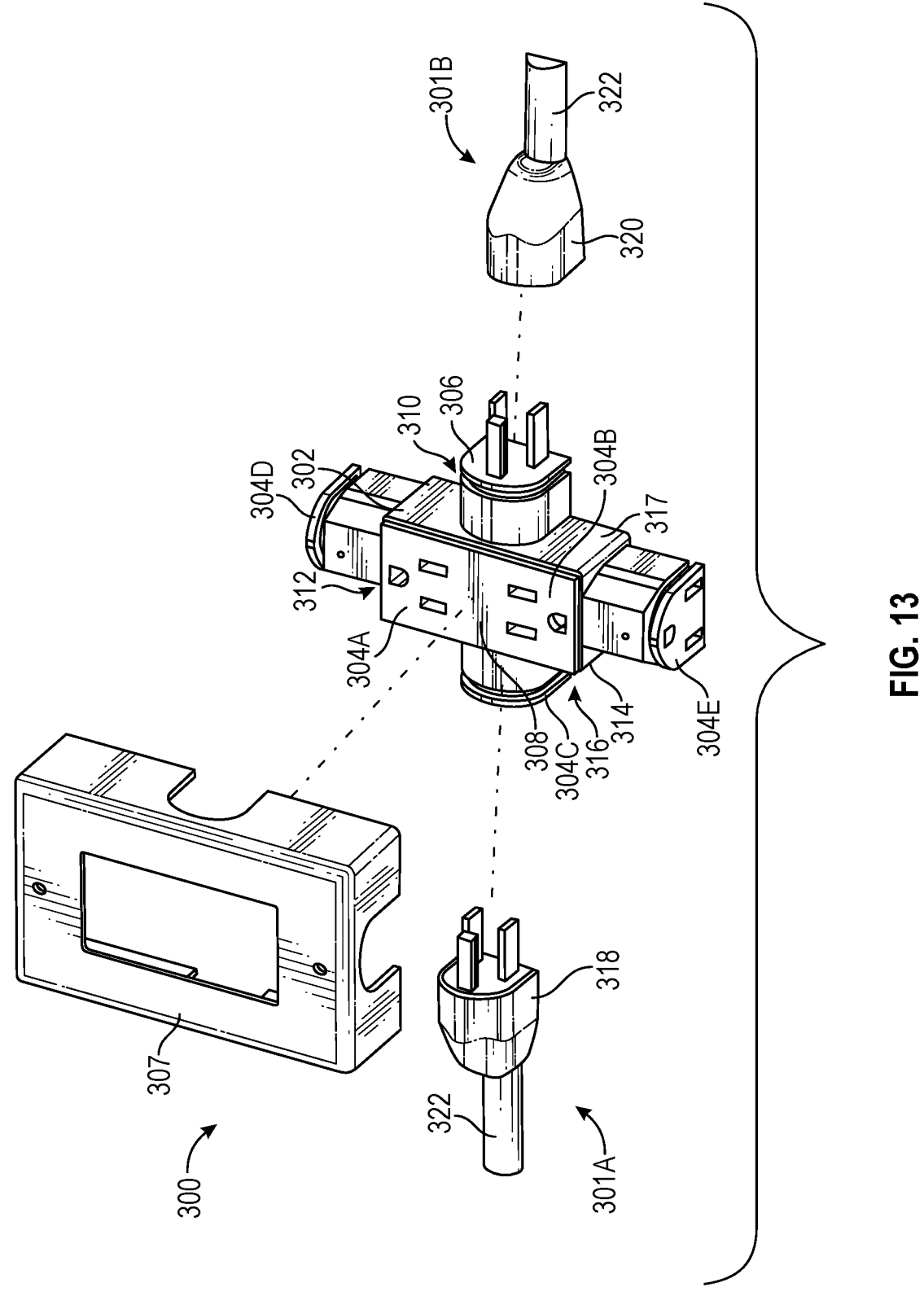
FIG. 13 illustrates an exploded, front side perspective view of an adhesive-backed electrical cable and electrical outlet assembly.
Figure 14:
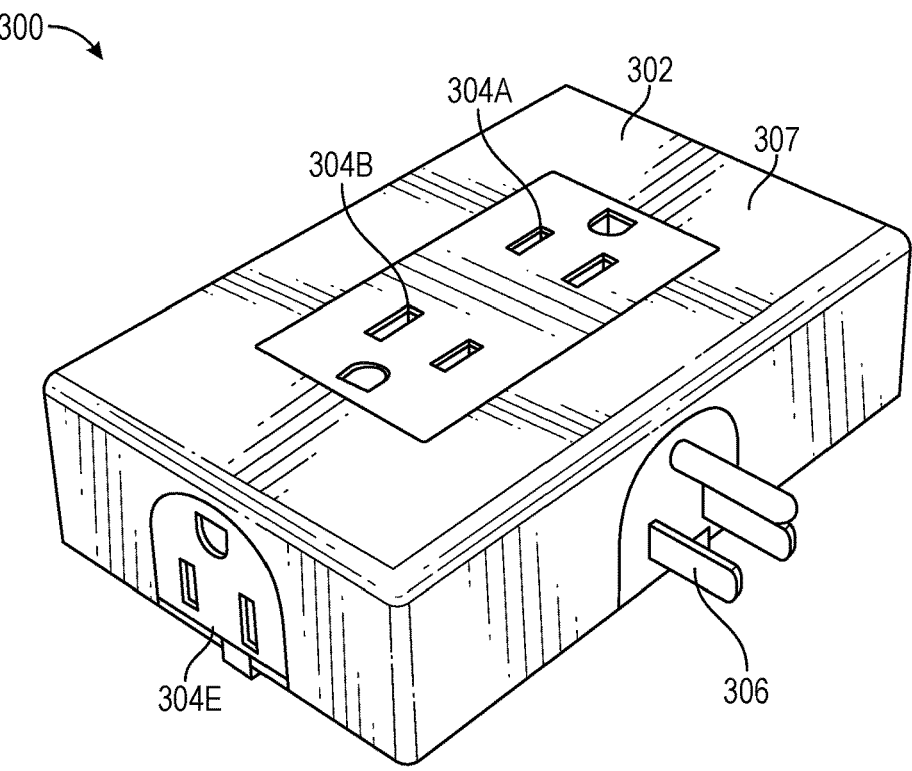
FIG. 14 illustrates a front side perspective view of an electrical outlet assembly.
Figure 15:
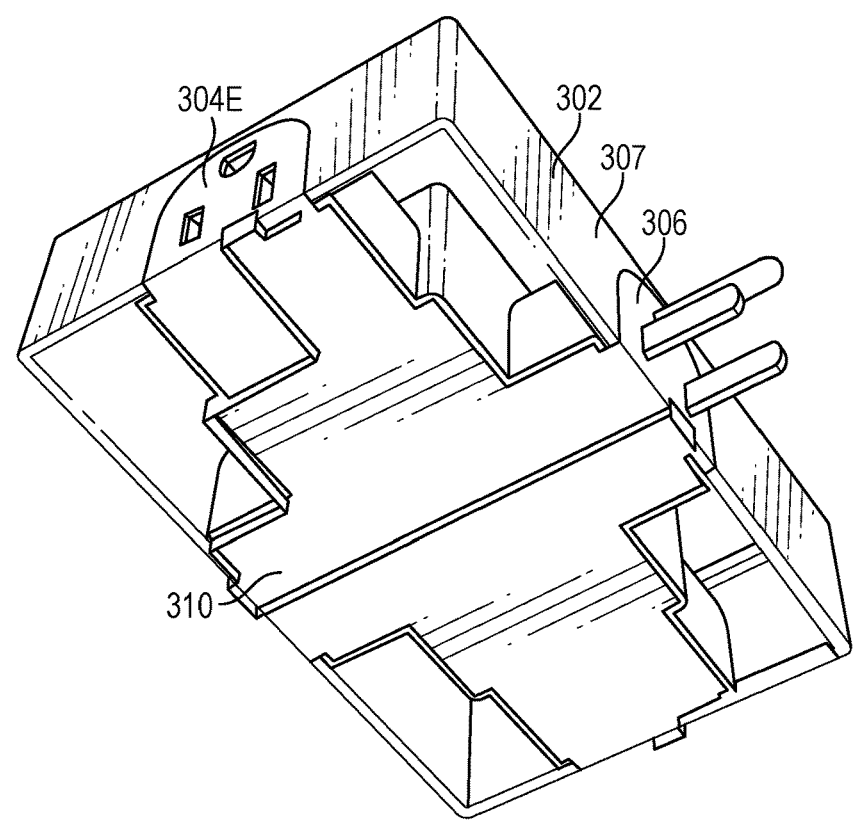
FIG. 15 illustrates a rear side perspective view of an electrical outlet assembly.
Figure 16:
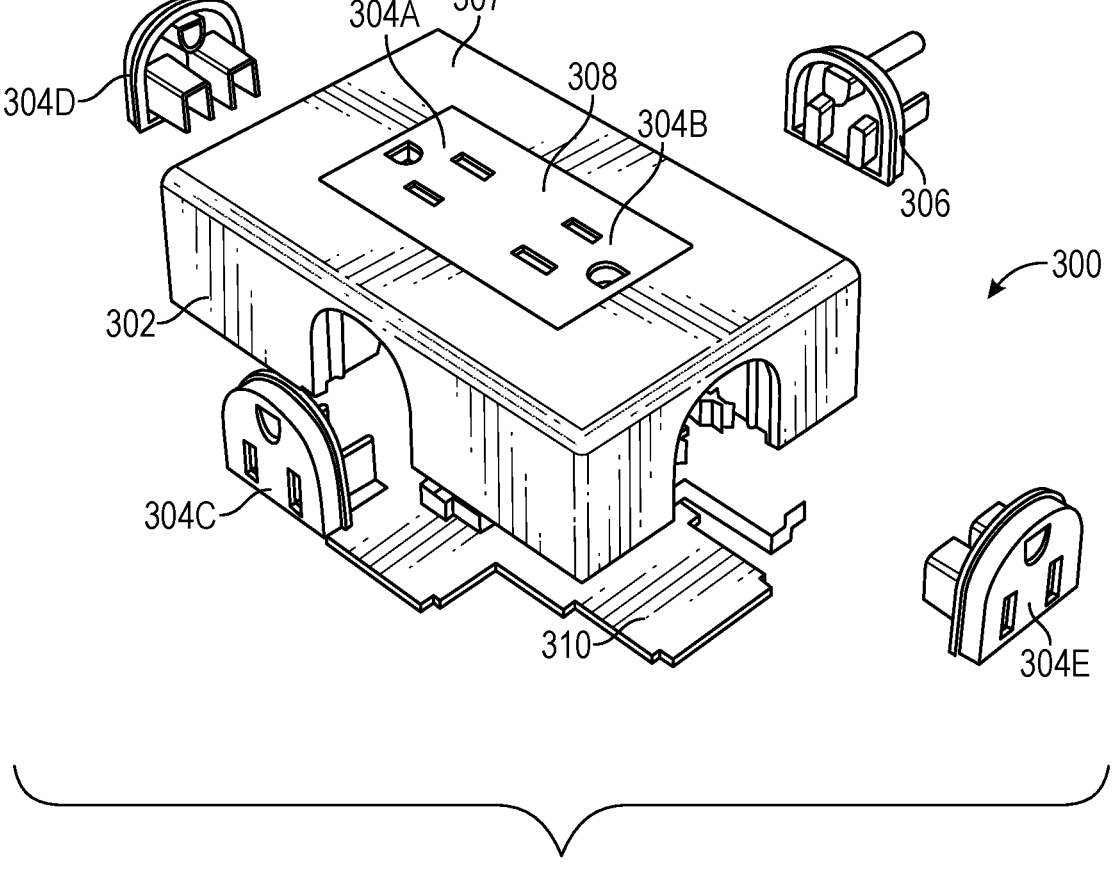
FIG. 16 illustrates an exploded, front side perspective view of an electrical outlet assembly.

As best seen in FIG. 13, wherein a faceplate 307 for the electrical outlet 302 has been removed, the electrical outlet may have a front 308, a back 310, a top 312, a bottom 314, a left side 316, and a right side 317. The electrical outlet 302, in some embodiments, may comprise a first receptacle 304A and a second receptacle 304B on the front 308, a third receptacle 304C on the left side 316, a plug 306 on the right side 317, a fourth receptacle 304D on the top 312, and a fifth receptacle 304E on the bottom 314. It will be appreciated that while one particular layout has been shown, alternative configurations of receptacles 304A-E and plugs 306 relative to one another may be used, as well as greater or fewer quantities of each, as discussed later herein.

A male connector 318 of the adhesive-backed electrical cable assembly 301A may be couplable to any one of the one or more receptacles 304A-E while a female connector 320 of an adhesive-backed electrical cable assembly 301B may be couplable to any one of the one or more plugs 306. When either the male connector 318 or female connector 320 is coupled to its respective receptacle 304A-E or plug 306, respectively, along the surfaces of the electrical outlet 302, it will be appreciated that a body of an electrical cable 322 will lay flush against the surface (e.g., ceiling, wall, floor) to which the electrical outlet 302 is installed. In other words, there is no space between the electrical cable 322 and the surface to which it is adhered.

The adhesive-backed electrical cable and outlet assembly 300 thus avoids the cluttered appearance of common plugs and electrical cables for electrical devices known in the art. Instead of an electrical cable protruding outward from a standard electrical outlet and immediately drooping haphazardly along the wall and floor, the adhesive-backed electrical cable 322 of the adhesive-backed electrical cable assembly 301A, 301B is seamlessly couplable to the electrical outlet 302 and capable of adherence directly to the wall or other surface along the length of the electrical cable 322. Accordingly, it will be appreciated that the adhesive-backed electrical cable and outlet assembly 300 eliminates tripping hazards and clutter that can contribute to electrical fires, personal injury, and damage to electrical devices.

Figure 17:
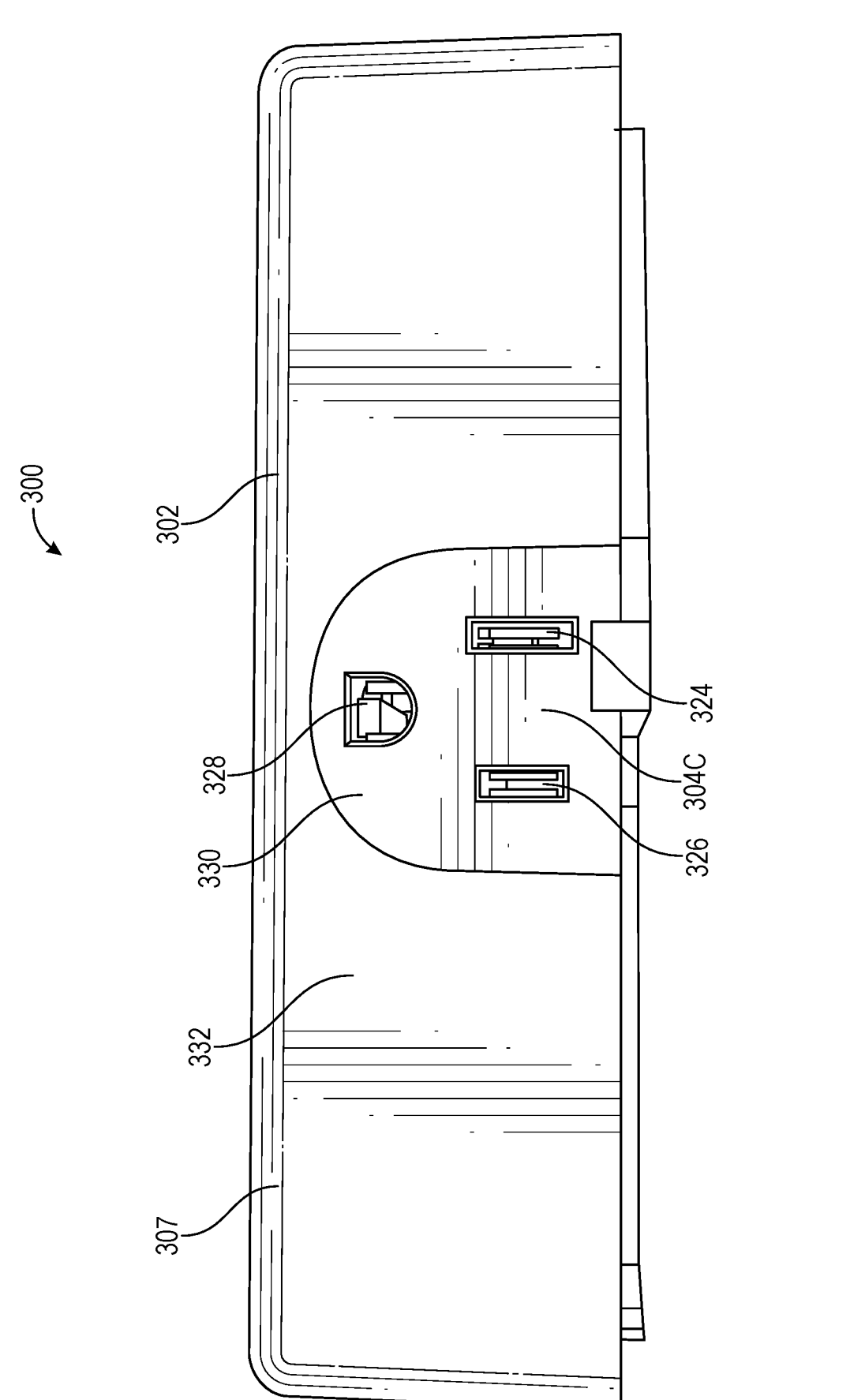
FIG. 17 illustrates a left side elevation view of an electrical outlet assembly.
Figure 18:
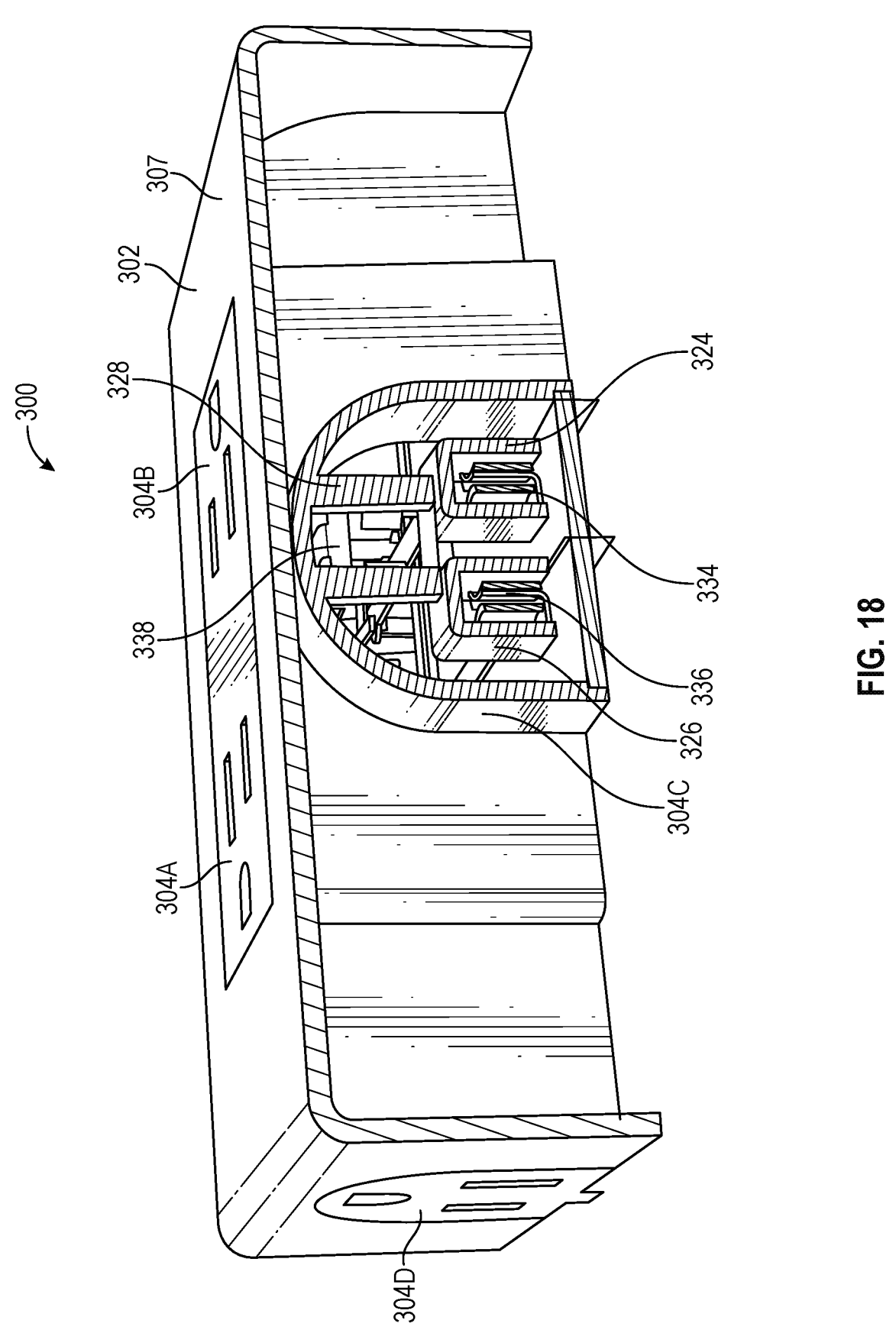
FIG. 18 illustrates a left side cross-sectional view of an electrical outlet assembly.
Figure 19:
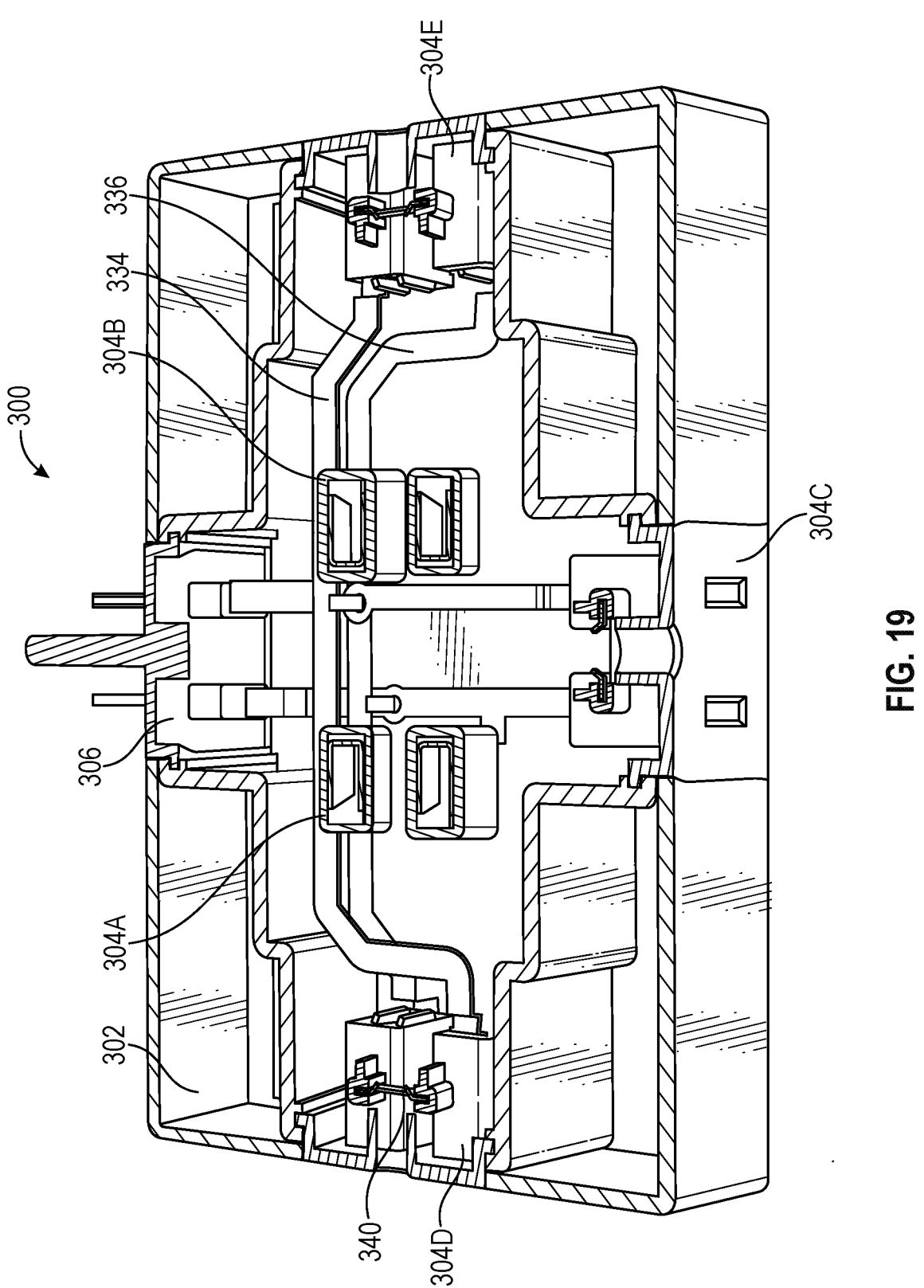
FIG. 19 illustrates a front cross-sectional perspective view of an electrical outlet assembly.

As best seen in FIGS. 17-19, the one or more receptacles 304A-E may each comprise a neutral slot 324, a hot slot 326, and a ground slot 328, each of the slots capable of receiving stab-in connections such as solid copper wire conductors. In some embodiments, the one or more receptacles 304A-E may be smart outlets 330 communicable with smart devices such as smartphones, TVs, LEDs, ACs, etc. The smart outlets 330 may be configured, according to known practices in the art, to communicate with the smart devices by wireless communication protocols (e.g., Wi-Fi, Bluetooth, ZigBee, Z-Wave, etc.). In some embodiments, the one or more receptacles 304A-E may be USB or micro-USB ports for charging mobile phones, tablets, and other electronic devices. The one or more receptacles 304A-E, without limitation, may be adaptable to a range of plugs, voltages, and frequencies to accommodate corresponding electrical devices and power grids from varying countries, without departing from the teaching herein. For example, the one or more receptacles 304A-E may be configured to accommodate 15 A 120V electrical devices, 20 A 120V electrical devices, 20 A 240V electrical devices, 30 A 240V electrical devices, 30 A 120V electrical devices, etc.

In some embodiments, the electrical outlet 302 may be a ground fault interrupter (GFI) outlet 332 (FIG. 17) configured to monitor the current flow through the electrical wiring coupled to the neutral slot 324 and the hot slot 326 of each of the one or more receptacles 304A-E. If the current in the electrical wiring is not the same within a range, without limitation, of 0-5 mA then the GFI outlet 332 will immediately trip, indicative of a current leak to the ground slot 318. The GFI outlet 332 may further comprise a reset button and a test button (not depicted herein), whereby the user may reset the GFI outlet 332 and return current flow to the one or more receptacles 304A-E after a test or trip has taken place. To verify whether the GFI outlet 332 is properly working, the user may plug in an electrical device into one of the receptacles 304A-E and actuate the test button. If the electrical device turns from ON to OFF after actuating the test button, then the GFI outlet 332 is working properly. In some embodiments, a sensor may constantly monitor the GFI outlet 332 for faults in the circuit and automatically cause an indicator light to flash or an alarm to sound when a fault occurs, thereby promptly alerting the user.

FIG. 19 illustrates a cross-sectional view of the electrical outlet 302 along a frontal plane thereof, wherein the internal circuitry is visible. As illustrated, the electrical outlet 302 of the adhesive-backed electrical cable and outlet assembly 300 may include a neutral wire 334 coupled to the neutral slot 324 of each of the one or more receptacles 304A-E, a hot wire 336 coupled to the hot slot 326 of each of the one or more receptacles 304A-E, and a ground wire (not visible in this view) coupled to the ground slot 328 of each of the one or more receptacles 304A-E.

In some embodiments, the electrical outlet 302 functions as an outlet splitter or hub without the need of being, itself, directly hardwired to grid power. In other words, the electrical outlet 302 may be simply coupled to a wall with no direct wiring (e.g., spliced wires) to grid power. An extension cord 322 may have a plug 318 inserted into grid power at one end, with the cord 322 being adhered to the wall or surface until the opposite end having the female connector 320 mates with the plug 306 of the outlet 302. The power from plug 306 is then distributed to each receptacle 304A-E. A user may then plug in other items in need of power to corresponding receptacles 304A-E. This embodiment is particularly beneficial when a user desires power in location that may not be able to access grid power directly, is not economically feasible, or the user otherwise desires the simple installation of the outlet 302 to the exterior of a wall or surface rather than pulling wires through a wall and cutting holes for a traditional outlet.

However, in other embodiments, it is contemplated that the outlet 302 may be coupled to grid power. For example, both the neutral wire 334 and the hot wire 336 are couplable to a building's power source through a wall or surface via wire splices or other known methods of tying into grid power. The ground wire may be coupled to a ground terminal 340 which may be a screw or metal object electrically grounded to the earth. The ground terminal 340 helps to dissipate any built-up static charge to protect any electrical device plugged into the electrical outlet 302 from potential harm, as well as to reduce the risk of electrical shock, electrocution, and fires caused by unexpected voltage spikes or short circuits.

Referring broadly again to FIGS. 12-19, in some embodiments, the electrical outlet 302 of the adhesive-backed electrical cable and outlet assembly 300 may further comprise a faceplate 307 or cover configured to shield the inside connections from outside influences. The faceplate 307 improves the overall safety of the electrical outlet 302 through concealment of the electrical wiring contained within the electrical outlet 302. The faceplate 307 prevents exposure to dust, dirt, and moisture that could otherwise damage the electrical wiring and create a fire hazard. The faceplate 307 further prevents children, pets, and users from accidental electrical shock via contact with exposed electrical wiring. The faceplate 307, in some embodiments, protects the electrical wiring within the electrical outlet 302 from rain, salty air, and other environmental elements in outdoor applications requiring weather-resistant and waterproof specifications. The faceplate 307 may be made from metal or plastic and screw or snap into place.

Figure 20:
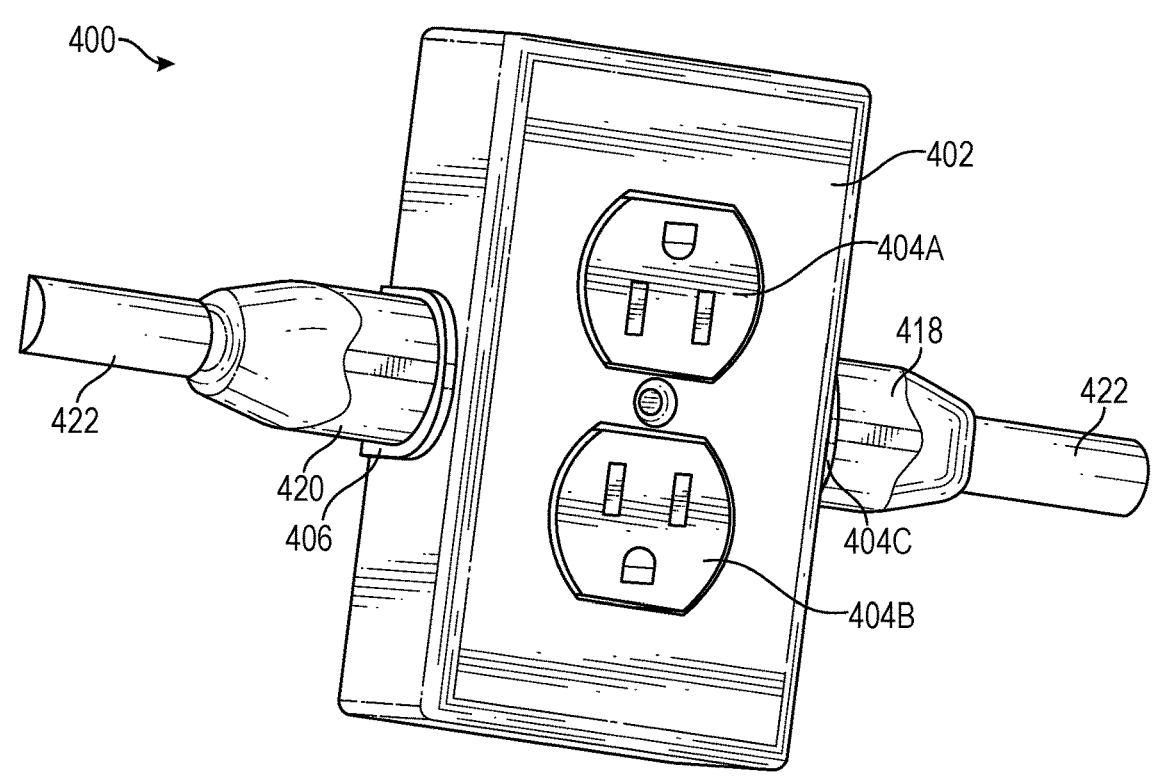
FIG. 20 illustrates a front side perspective view of an adhesive-backed electrical cable and electrical outlet assembly.
Figure 21:
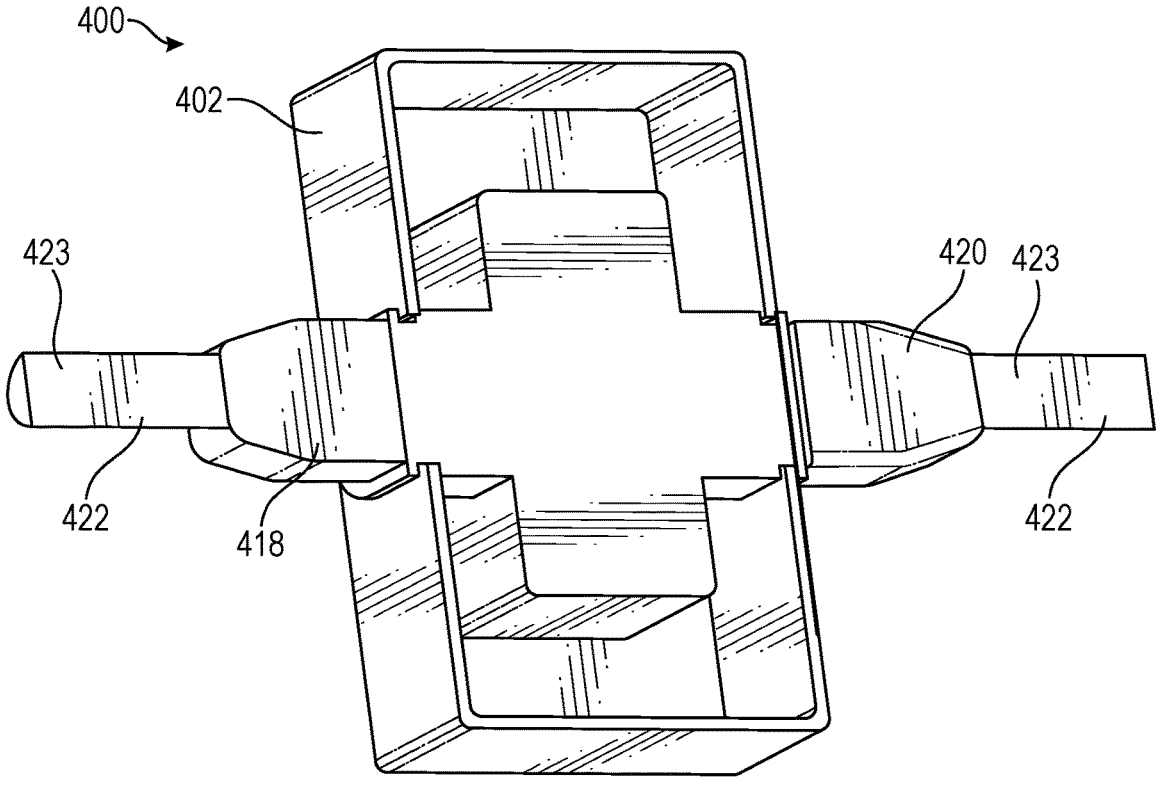
FIG. 21 illustrates a rear side perspective view of an adhesive-backed electrical cable and electrical outlet assembly.
Figure 22:
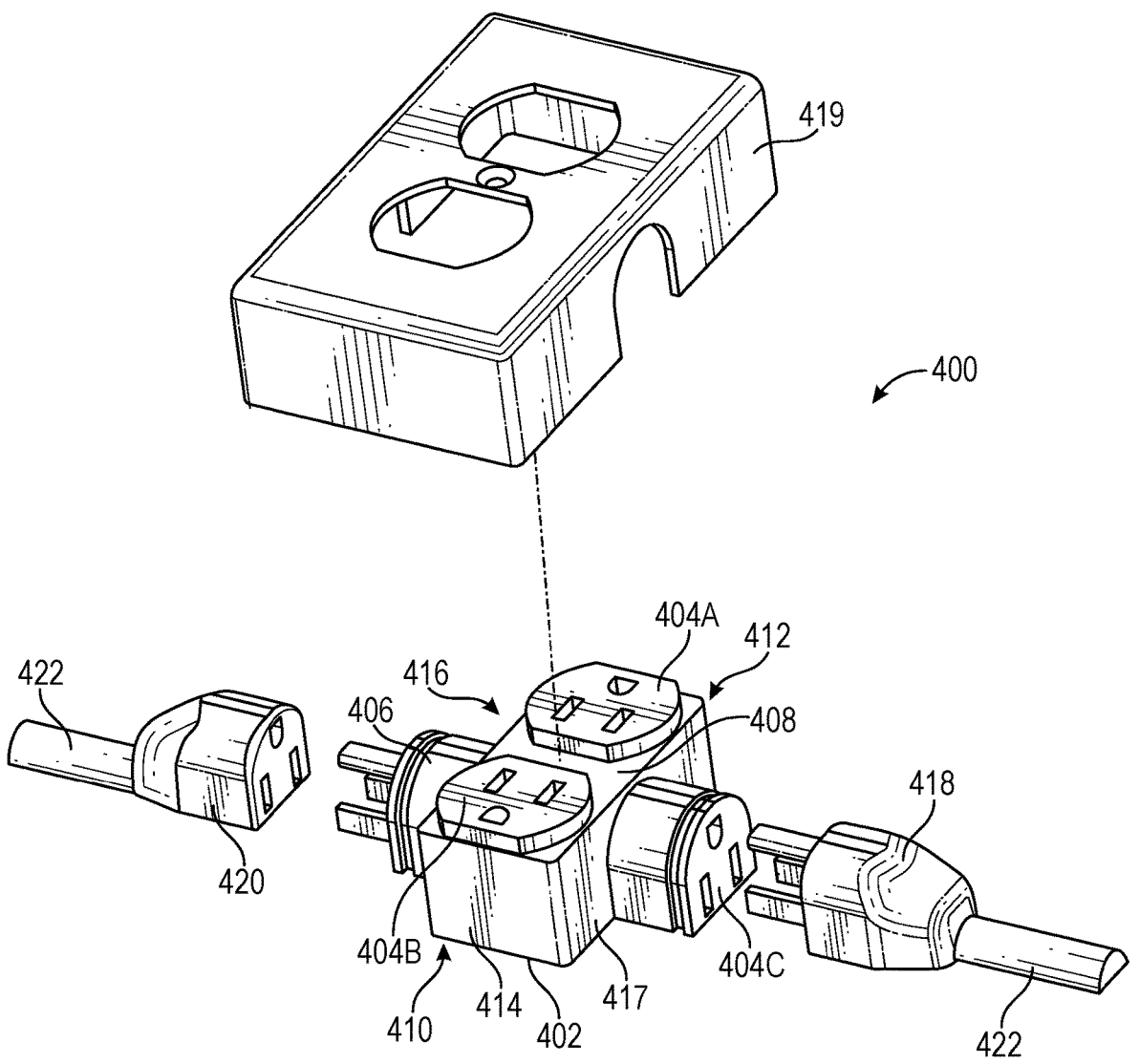
FIG. 22 illustrates an exploded, front perspective view of an adhesive-backed electrical cable and electrical outlet assembly.

As illustrated in FIGS. 20-22, in some embodiments, an adhesive-backed electrical cable and outlet assembly 400 comprises an electrical outlet 402 that features one or more receptacles 404A-C and one or more plugs 406 along the surfaces of the electrical outlet 402. The electrical outlet 402, as best seen in FIG. 22, may have a front 408, a back 410, a top 412, a bottom 414, a left side 416, and a right side 417, the electrical outlet 402 couplable to a faceplate 419. In said embodiments, the electrical outlet 402 features a first receptacle 404A and a second receptacle 404B on the front 408, a third receptacle 404C on the right side 417, and a plug 406 on the left side 416. When either a male connector 418 or female connector 420 is coupled to its respective receptacle 404A-C or plug 406 on the sides 416, 417 of the electrical outlet, it will be appreciated that an electrical cable 422 will lay flush against the surface (e.g., ceiling, wall, floor) to which the electrical outlet is installed, due to its unique half-moon shape. In other words, and as best seen in FIG. 21, because the cable 422 has a flat side 423, it is capable of being flush with the wall or surface. As discussed earlier, the flat side 423 may comprise an adhesive, allowing it to adhere flush to a wall or surface.

Figure 23:
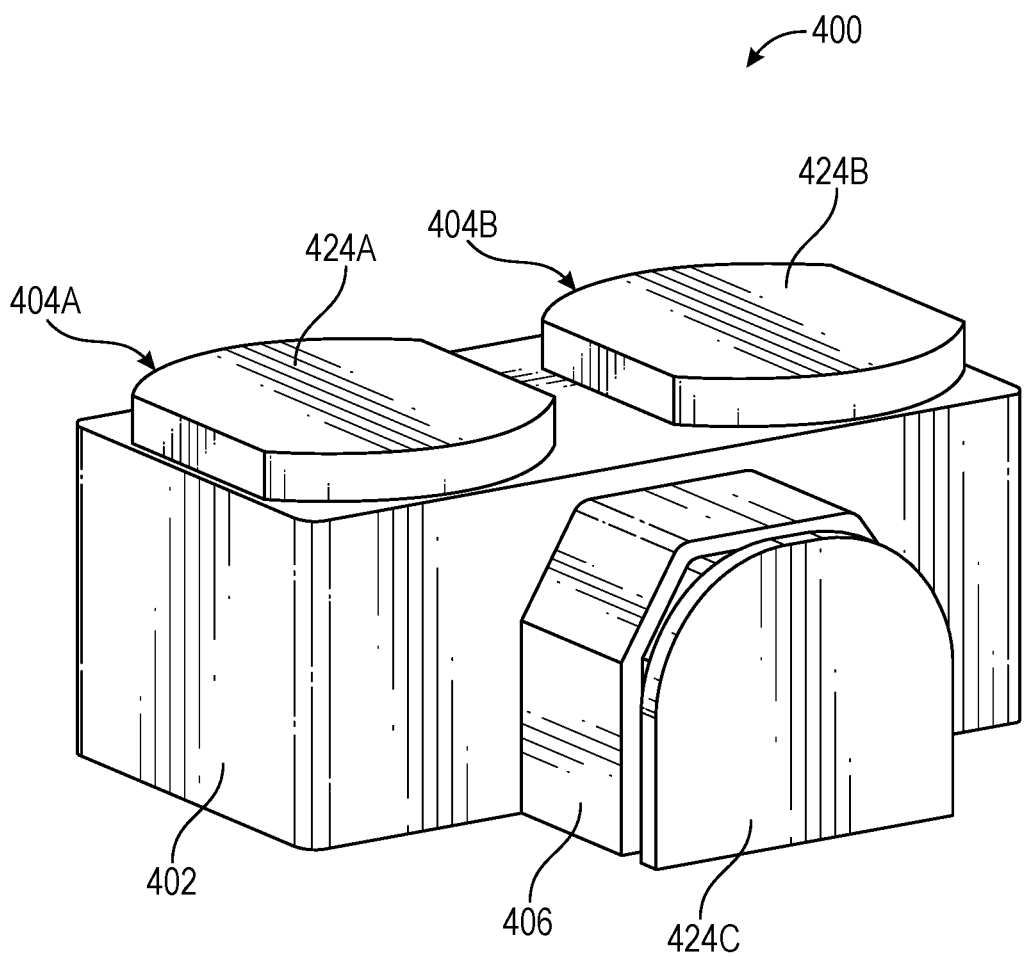
FIG. 23 illustrates a front side perspective view of an electrical outlet with outlet plug covers.

In FIG. 23, each of the one or more receptacles 404A-B and the one or more plugs 406 may receive outlet plug covers 424A-C. The outlet plug covers 424A-C may be complementary in size and shape to the one or more receptacles 404A-B and one or more plugs 406 such that they snap in place over any openings or prongs. In some embodiments, it is contemplated that the outlet plug covers 424A-C may feature plastic prongs that mimic the metal prongs of electrical cables, and which are removably insertable within the neutral slot, the hot slot, and the ground slot of each of the one or more receptacles 404A-B. The outlet plug covers 424A-C act as childproof barriers that help keep children away from electrical hazards when the one or more receptacles are not in use. The outlet plug covers 424A-C can also be applied for seasonal weather events and weatherproofing in outdoor use cases.

Figure 24:
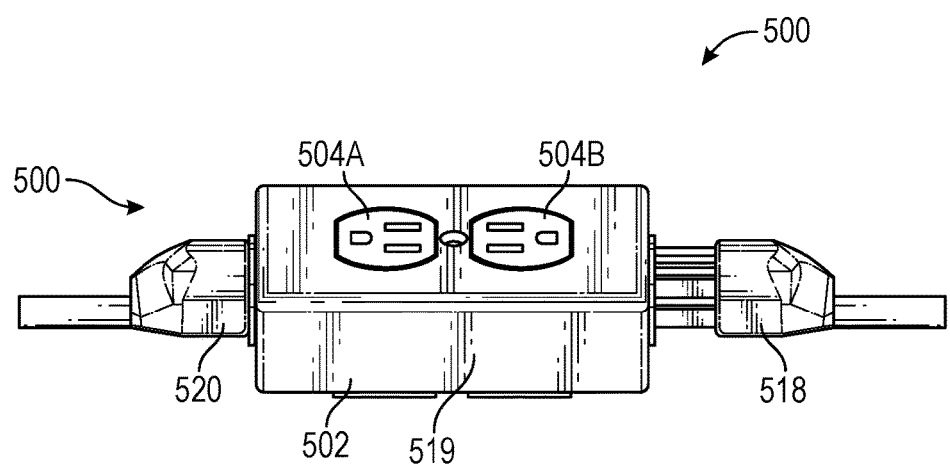
FIG. 24 illustrates a front side perspective view of an adhesive-backed electrical cable and electrical outlet assembly.
Figure 25:
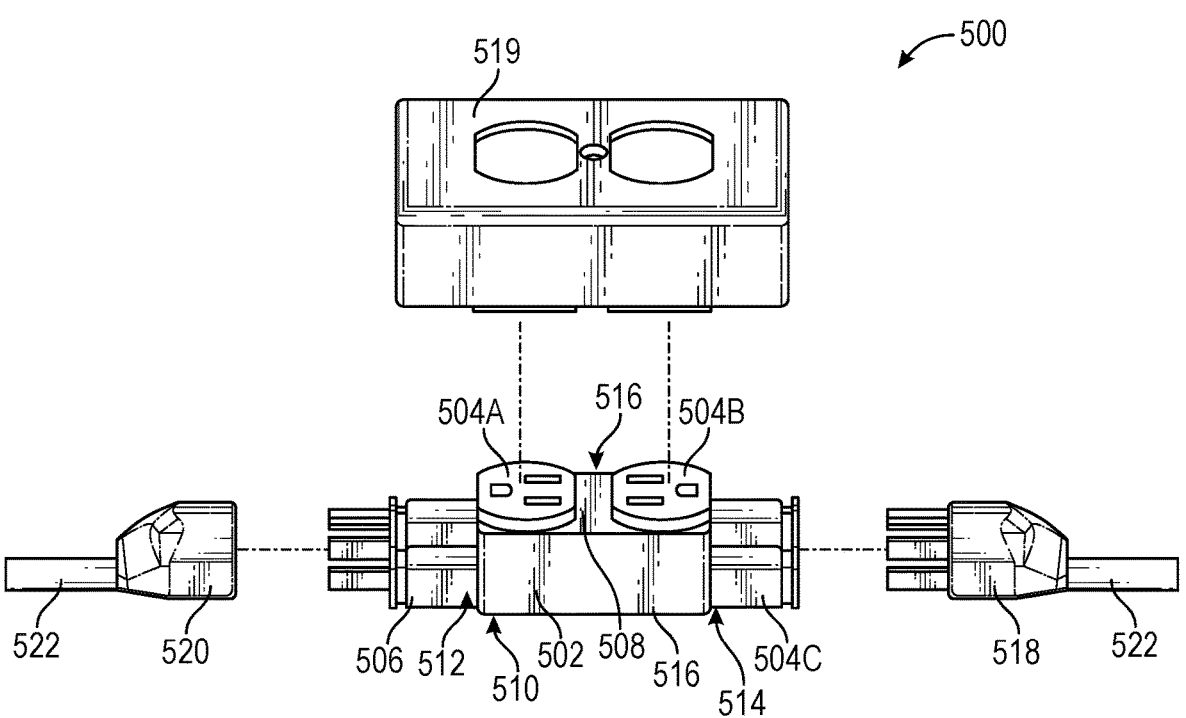
FIG. 25 illustrates an exploded, front side perspective view of an adhesive-backed electrical cable and electrical outlet assembly.

As illustrated in FIGS. 24-25, an adhesive-backed electrical cable and outlet assembly 500 comprises an electrical outlet 502 that features one or more receptacles 504A-C and one or more plugs 506 along the surfaces of the electrical outlet 502. The electrical outlet 502, as best seen in FIG. 25, may have a front 508, a back 510, a top 512, a bottom 514, a left side 516, and a right side (not visible), the electrical outlet 502 couplable to a faceplate 519. In said embodiments, the electrical outlet 502 features a first receptacle 504A and a second receptacle 504B on the front 508, a third receptacle 504C on the bottom 514, and a plug 506 on the top 512. When either a male connector 518 or female connector 520 is coupled to its respective receptacle 504A-C or plug 506 on the top 512 and the bottom 514 of the electrical outlet 502, it will be appreciated that the adhesive-backed electrical cable 522 will lay flush against the surface (e.g., ceiling, wall, floor) to which the electrical outlet is installed, due to the cable 522 comprising a flat side.

Figure 26:
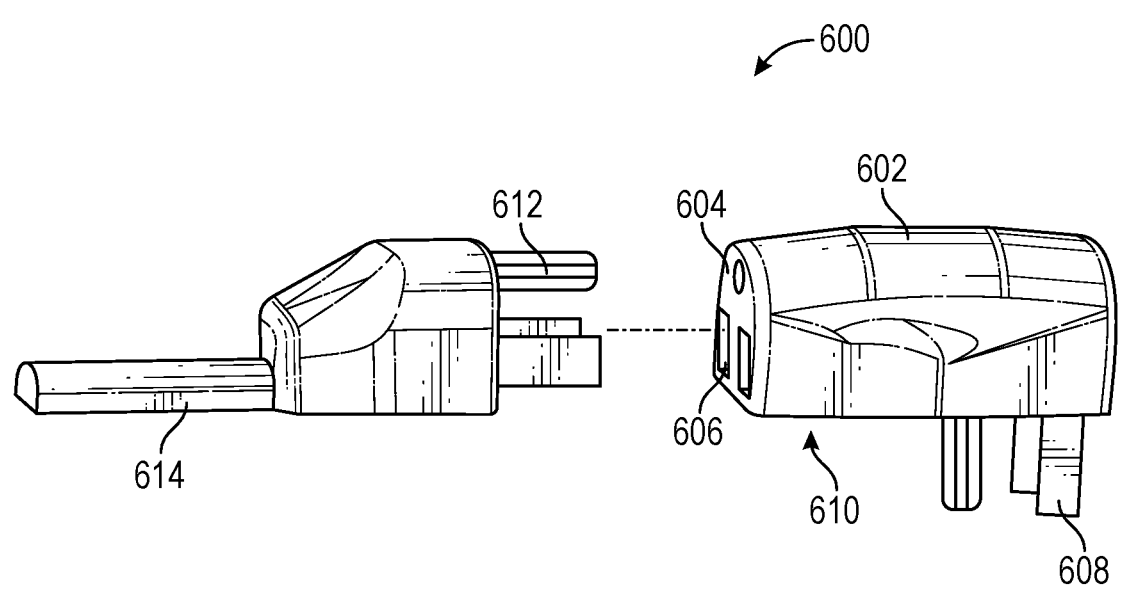
FIG. 26 illustrates a top elevation view of an adapter and an adhesive-backed electrical cable.
Figure 27:
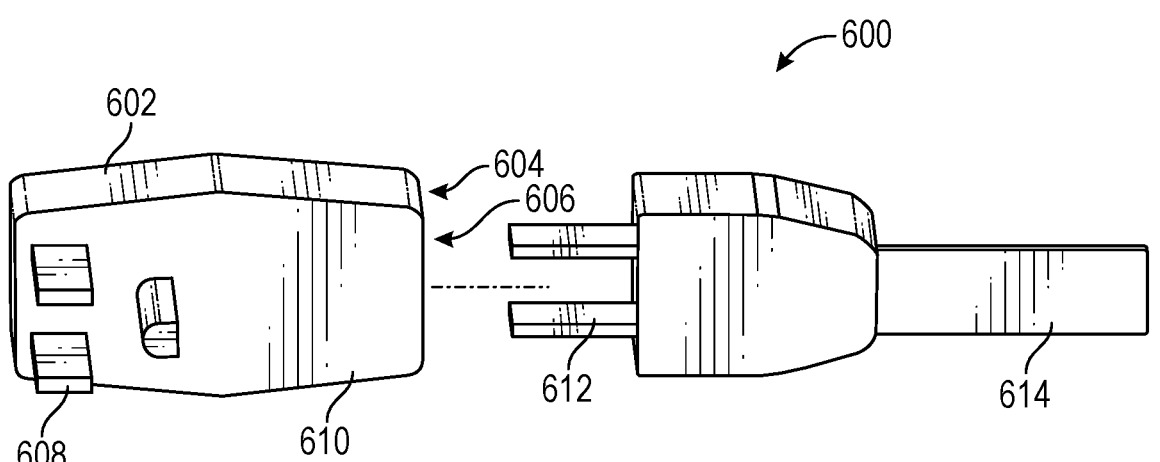
FIG. 27 illustrates a rear, side perspective view of an adapter and an adhesive-backed electrical cable.

As illustrated in FIGS. 26-27, in some embodiments, an adhesive-backed electrical cable and outlet assembly 600 comprises an adapter 602. The adapter 602 may feature a receptacle 604 on a first side 606 and prongs 608 on a second side 610, wherein the second side may be substantially flat. As shown, the first side 606 may be perpendicular to the second side 610, creating a 90-degree turn. In some use cases, prongs 612 of an electrical cable 614 may be coupled to the receptacle 604 of the adapter 602. The adapter 602 thereby enables the electrical cable 614 to be compatible with either receptacles or prongs via either the male connector or female connector ends of the adhesive-backed electrical cable 614. The adapter 602 also facilitates the introduction of a 90-degree turn in the directionality of the electrical cable 614 in order to potentially follow around a wall, aid in transitionary spaces between floors and walls or walls and ceilings, or otherwise connect to a standard, in-wall power outlet (thereby allowing the cable 614 to remain flush with the wall or surface).

It will be appreciated that while common electrical cables in the prior art are disorderly to manage and often contrast against the surfaces to which they are located, the adhesive-backed electrical cable and outlet assembly, as disclosed herein, both conforms to straight lines and bends at corners, is adherable to flat surfaces, and complements the aesthetic design of the surface along which it is installed. In addition, the connecting point between the adhesive-backed electrical cable and the electrical outlet provides for a flush connection that is more secure and resistant to inadvertent removal. The adhesive-backed electrical cable assembly eliminates tripping hazards caused by common, unsecured electrical cords that may damage electrical devices and present a fire danger. Further, the electrical outlet allows for electrical outlets to be located on walls or surfaces where traditional, in-wall outlets may not be available or desired. Accordingly, the present disclosure solves the above identified problems in the prior art and others.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An adhesive-backed electrical cable and outlet assembly, comprising:

an electrical cable, comprising:
  a first electrical connector;
  a second electrical connector opposite the first electrical connector;
  an adhesive layer on a first, flat side of the electrical cable;
  a release liner substantially coextensive with the adhesive layer; and
  a second side, opposite the first flat side, comprising a semi-circular formfactor;

an electrical outlet, comprising:
  a first receptacle and a second receptacle on a front side;
  a third receptacle on left side;

a plug on the right side;

a fourth receptacle on the top; and a fifth receptacle on the bottom;

a faceplate couplable to the electrical outlet; and the electrical outlet configured to mount on a wall with prongs of the plug extending parallel to the wall, the
first flat side of the electrical cable configured to mount
flush on the wall when the first electrical connector of
the cable is coupled thereto.

2. The adhesive-backed electrical cable and outlet assembly of claim 1, wherein the electrical outlet is a smart outlet
configured to communicate by wireless protocols with a
smart device.

* * * * *